No. 696,371. Patented Mar. 25, 1902.
J. F. GRAAE.
INSTRUMENT FOR TESTING TRANSLUCENT SUBSTANCES BY COLOR.
(Application filed Mar. 6, 1901.)
(No Model.) 2 Sheets—Sheet 1.

Witnesses:
John A. Rennie
George Barry Jr.

Inventor:
John Frederick Graae
By Brown & Seward
his Attorneys

No. 696,371. Patented Mar. 25, 1902.
J. F. GRAAE.
INSTRUMENT FOR TESTING TRANSLUCENT SUBSTANCES BY COLOR.
(Application filed Mar. 6, 1901.)
(No Model.) 2 Sheets—Sheet 2.
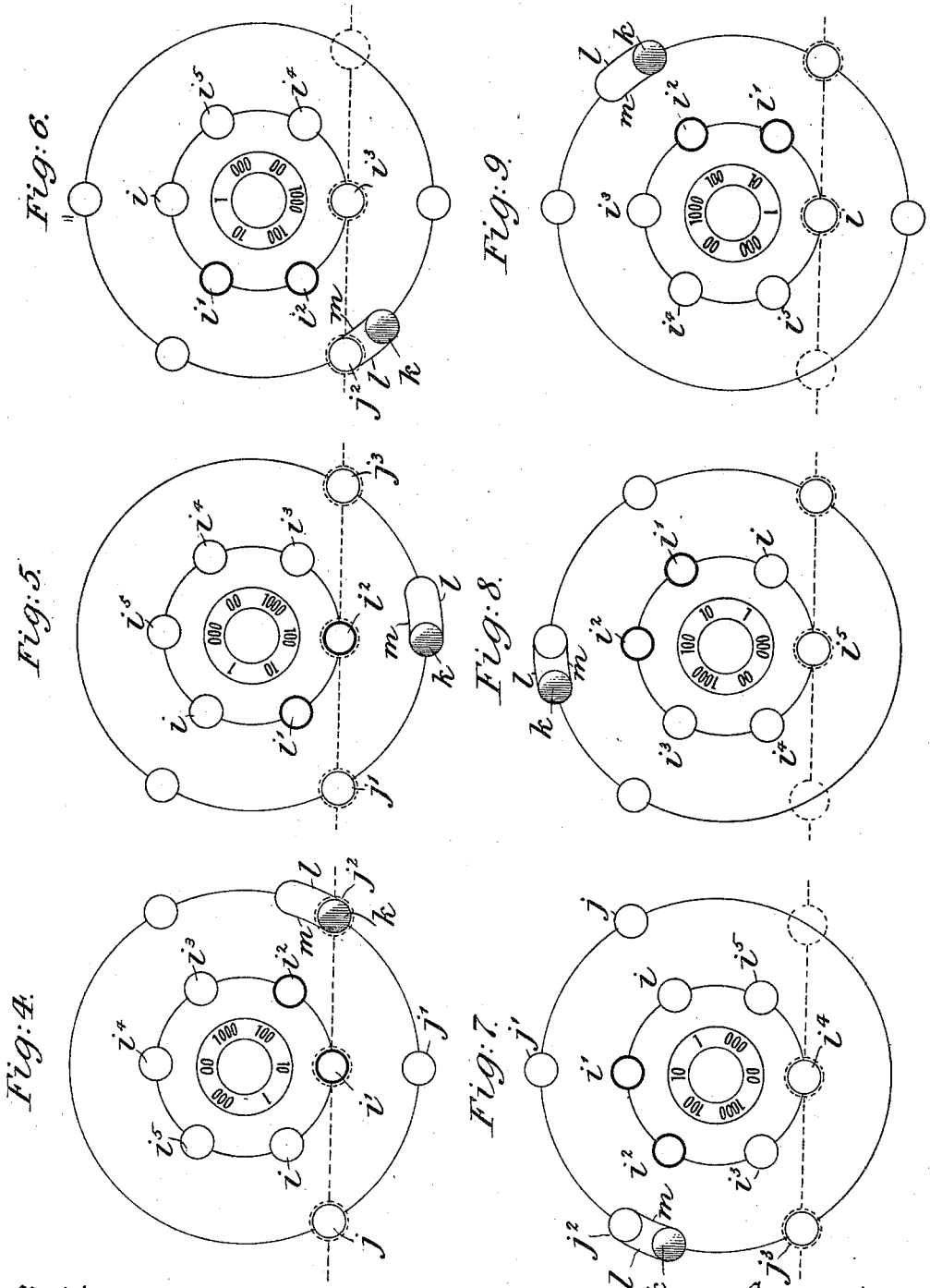

UNITED STATES PATENT OFFICE.

JOHN FREDERICK GRAAE, OF BROOKLYN, NEW YORK.

INSTRUMENT FOR TESTING TRANSLUCENT SUBSTANCES BY COLOR.

SPECIFICATION forming part of Letters Patent No. 696,371, dated March 25, 1902.

Application filed March 6, 1901. Serial No. 50,076. (No model.)

*To all whom it may concern:*

Be it known that I, JOHN FREDERICK GRAAE, a citizen of the United States, and a resident of the borough of Brooklyn, in the city and State of New York, have invented a new and useful Instrument for Testing Translucent Substances by Color, of which the following is a specification.

My invention relates to an instrument for testing translucent substances by color.

For the purposes of illustrating a practical embodiment of my invention I have chosen that form of the instrument which is particularly adapted to testing fluids, samples of which may be placed in glass bottles, the object being to establish—as, for example, in the oil trade—a standard of color which shall be universal, and thus obviate the confusion which arises from the different marks used to identify substantially the same products by different manufacturers.

Figure 1:
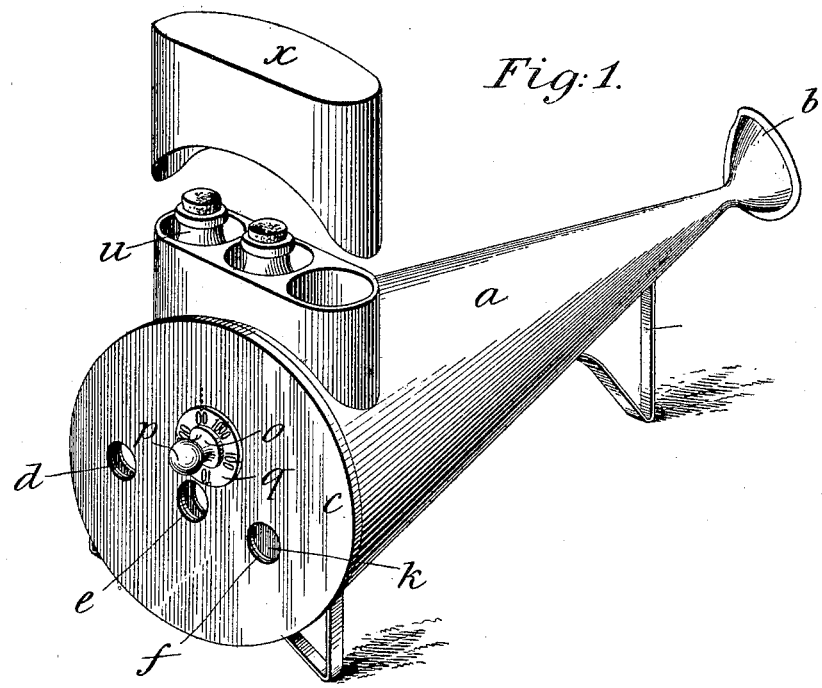
Figure 2:
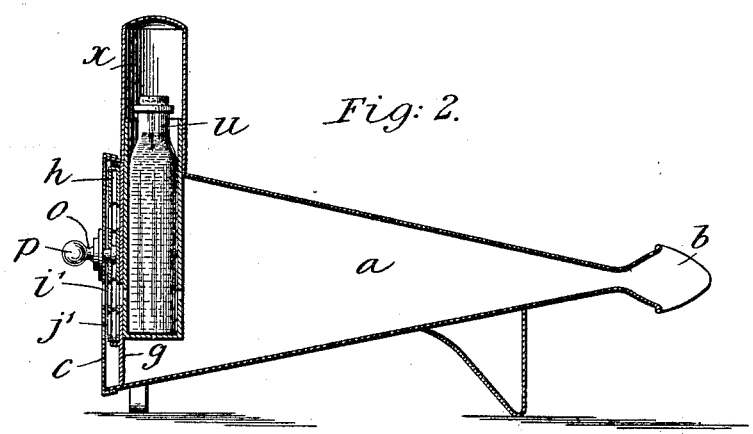
Figure 3:
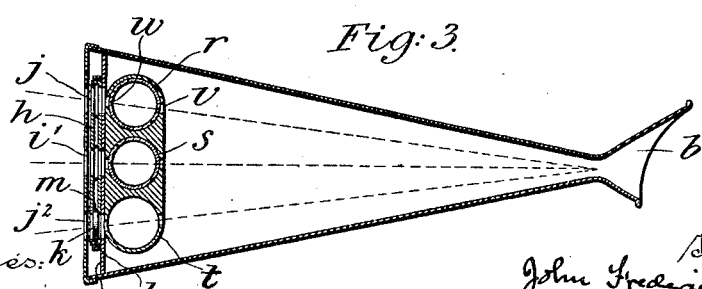

In the accompanying drawings, Figure 1 is a view in perspective showing the instrument as it appears ready for use with two bottles containing specimens in position, save only that the cap for completely inclosing the bottles and shutting out light from the top is lifted from its position to show the bottles in their receptacles. Fig. 2 is a vertical longitudinal section showing the removable cap in its closed adjustment. Fig. 3 is a horizontal section in the plane of the line of the peep-holes, and Figs. 4, 5, 6, 7, 8, 9 are diagrammatical views showing the several positions which the rotary disk carrying the standard colors may assume in the practical use of the testing instrument.

The body of the instrument (denoted by $a$) is preferably cone-shaped and provided at its apex or the end to which the eye is applied with a flaring shield $b$ for the purpose of engaging the flesh in proximity to the eye to completely shut out the light. The opposite end of the body $a$ is closed by a cover $c$ and provided with three peep-holes $d$, $e$, and $f$ in horizontal alinement and slightly below the longitudinal axis of the cone. Spaced from the end closure or cover $c$ there is a diaphragm $g$, provided with openings therethrough in alinement with the openings $d$, $e$, and $f$ in the end closure or cover $c$, and between the cover $c$ and diaphragm $g$ there is a rotary disk $h$, in the present instance composed of front and back walls spaced a short distance apart to permit the introduction of pieces of glass which are to determine the different standard units of color. This disk $h$ has formed through its opposite walls series of openings located in the circumferences of circles of different radii, which may be best understood from observing the diagrams, Figs. 4 to 9, inclusive. The openings arranged in the circumference of the circle of the lesser radius are denoted by $i$, $i'$, $i^2$, $i^3$, $i^4$, and $i^5$, six in all, arranged at equal distances apart on the circumference of the circle, and the openings in the circumference of the circle of the greater radius are denoted by $j$, $j'$, $j^2$, and $j^3$, four in all, located one-sixth of a circumference apart and in radial alinement with the openings $i$, $i'$, $i^2$, and $i^3$. It will be observed that the diagrams, Figs. 4 to 9, inclusive, represent the circular lines of openings on a larger scale than is represented in Figs. 1, 2, and 3; but the corresponding openings in Figs. 2 and 3, taken with the parts in the position shown in the diagram Fig. 4, have been lettered to show their relative positions when the parts are assembled.

The opening $i^3$ in the disk is provided with a glass having a color representing a grade one step or unit below the highest assumed grade—viz., a grade having the whiteness of distilled water—and represents the standard color of grade 1. The opening $i^4$ in the disk is provided with a glass having a color corresponding to grade No. 10, the opening $i^5$ with a glass of a still deeper color corresponding to grade No. 100, and the opening $i$ with a glass having a still deeper color and corresponding to grade No. 1,000. The openings $i'$ $i^2$ are free from obstruction for purposes which will hereinafter appear. The openings $j$ $j'$ $j^2$ $j^3$ in the outer circumferential line are free from obstruction, with the exception of the opening $j^2$, which is arranged to be automatically opened and closed by a circular shutter $k$, which when the parts are in the position shown in Figs. 1, 2, 3, drops into the position shown in diagram Fig. 4 to completely cover the opening $j^2$; but when the rotary disk $h$ is turned into the position shown in Fig. 6 the shutter $k$ will fall at the opposite end of its limited traveling movement and uncover the opening $j^2$. The circular shutter $k$ is free to travel between guide-walls inserted between the front and back walls of the rotary disk a distance sufficient to open and close the opening $j^2$ through the disk. These guide-walls are represented in Fig. 3 by $l$ and $m$ and are indicated on Fig. 4.

The rotary disk $h$ is so mounted between the cover $c$ and diaphragm $g$ that the line of openings $i$ $i'$, &c., in the disk will come one after another opposite the peep-hole $e$ in the cover $c$ and corresponding peep-hole in the diaphragm $g$, while the openings $j$ $j'$, &c., will come one after another opposite the peep-holes $d$ $f$ in the cover $c$ and the corresponding peep-holes in the diaphragm $g$. The disk $h$ has a peripheral bearing formed by a curved wall $n$, fixed in position between the cover $c$ and the diaphragm $g$, and the said disk $h$ is rotated by means of a spindle $o$, provided with a knob $p$, which spindle rotates freely within the cover $c$ and is fixed to the rotary disk $h$ to cause the latter to turn together with it. The spindle $o$ has also fixed to rotate therewith on the outer face of the cover $c$ a dial $q$, provided with a series of symbols to indicate the particular standard of color which is to occupy a position before the peep-hole $e$ for purposes of comparison of a specimen with the standard color or to determine the presence of an unobstructed opening before the peep-hole $e$ for the purpose of comparing two or more specimens. In the present form of my instrument I provide a dial with the symbols "00," "000," "1," "10," "100," "1000" for the purpose of indicating, respectively, that two of the peep-holes are unobstructed for the purpose of comparing two specimens, three of the peep-holes unobstructed for the purpose of comparing three specimens, one of the peep-holes unobstructed and its adjacent one covered by a glass indicating the standard 1, and in order one of the peep-holes unobstructed and another covered by glasses indicating the standards 10, 100, and 1,000.

Provision is made for inserting the specimens in position to be compared with the standards or with one another by a group of receptacles in the present instance a group of three, (denoted by $r$, $s$, and $t$,) which in the present instance are formed in a block of metal inserted into the top of the body $a$ in proximity to the diaphragm $g$ and made cylindrical to receive glass bottles $u$, containing the specimens to be examined. For present purposes I make the receptacles $r$ one inch in diameter, and they are provided on their opposite walls with peep-holes (denoted by $v$ and $w$) in alinement with the peep-hole $d$ in the cover $c$, and the receptacles $s$ and $t$ are in like manner provided with peep-holes in alinement, respectively, with the peep-holes $e$ and $f$ in the cover $c$. These peep-holes, through the receptacles, the diaphragm $g$, the disk and cover $c$, are in right lines from the point of vision, as indicated in Fig. 3. The group of receptacles $r$, $s$, and $t$ is conveniently provided with a cap $x$, which may be slid into position over the top of the group of receptacles to completely shut out the light from the interior of the receptacles. The cap may be deep or shallow, as may suit convenience. In the present instance it is made to accommodate bottles of varying heights in the respective receptacles.

In using the instrument, suppose it be desired to compare two samples, the rotary disk $h$ will be turned to bring the dial into the position shown in Figs. 1, 2, 3, and diagram 4 with the "00" on the dial at a predetermined point on the face of the cover, in the present instance the uppermost point. This leaves the unobstructed opening $i'$ in the disk opposite the peep-hole $e$ in the cover and the opening $j$ in the disk opposite the peep-hole $d$ in the cover, while the opening $j^2$ is closed by the shutter $k$. If then bottles containing samples be placed in the receptacles $r$ and $s$ and the cap $x$ closed, a comparison between the samples may be made by placing the eye to the instrument and holding it toward a source of pure white light, the contents of the bottles being in the direct line of vision. If, again, it be desired to compare three samples or two samples with a third, this may be accomplished by bringing the "000" on the dial to the predetermined point on the front in the position represented by the diagram Fig. 5. This will bring the unobstructed opening $i^2$ of the disk opposite the peep-hole $e$ in the front, the opening $j'$ opposite the peep-hole $d$, and the opening $j^3$ in the disk opposite the peep-hole $f$ in the front. Specimens may then be inserted in the receptacles $r$ $s$ $t$ and the cap closed. The line of vision will now pass through the contents of the three bottles without other obstruction than such as results from the coloring-matter in the contents of the bottles. Again, if it be desired to compare a specimen with the standard indicated by the No. 1 glass, the dial may be turned into the position to bring the number "1" to register with the predetermined point on the front, as shown in the diagram Fig. 6. This will bring the glass placed opposite the opening $i^3$ in the disk opposite the peep-hole $e$ in the front, while the opening $j^2$ in the disk will be opposite the peep-hole $d$ in the front, and its shutter $k$ will have been thrown into the position shown in Fig. 6 under the influence of gravity, leaving an unobstructed entrance to the light. The peep-hole $f$ in the front will be closed by the absence of opening opposite it in the rotary disk $h$, and if a specimen be placed in the receptacle $r$ and the cap closed it may be compared with the color or absence of color in the glass denoting standard 1. In a similar manner the glasses indicating standards 10, 100, and 1,000 may be brought before the peep-hole $e$ by turning the dial to bring the numbers "10," "100," "1,000," respectively, opposite the predetermined point on the front, and in each instance there will be left free, as shown in diagram Figs. 7, 8, and 9, a peep-hole, either the peep-hole *d* or the peep-hole *f*, adjacent to the peep-hole *e*, unobstructed for comparing the sample placed either in the receptacle *r* or the receptacle *t* with the standard color.

While I have shown three receptacles and three peep-holes, it is obvious that the number might be increased or diminished at pleasure and that the standard units might be increased or diminished without departing from the spirit and scope of my invention, and also that other means than colored glass might be employed—as, for example, colored liquid—to serve as the standard with which to compare the various samples, and while I have particularly described my instrument with reference to testing liquids by color I do not wish to limit myself to this particular species of use, as it is obvious that the instrument might serve well for applying the color test to translucent substances other than oils or liquids.

What I claim is—

1. An instrument for applying the color test to substances, comprising a dark chamber provided with an opening for the eye and with peep-holes for the admission of light, a rotary disk intermediate of said eye and peep-hole openings, the said disk being provided with unobstructed openings and openings obstructed by one or more substances of standard color, the openings being so arranged that when a standard color is in front of one of the peep-holes, an unobstructed opening will coincide with another of said peep-holes, means for rotating the disks and means for holding a sample in the line of vision leading to the unobstructed peep-hole, substantially as set forth.

2. An instrument for applying the color test comprising a dark chamber provided with an opening for the eye and openings for the admission of light, a disk provided with openings adapted to register with the said openings in the dark chamber, one or more of said openings being provided with a substance indicating a standard color and another left unobstructed, a dial arranged to rotate together with the said disk to bring certain of said peep-holes in the disk in alinement with the openings in the dark chamber and receptacles for receiving samples in the dark chamber, the walls of said receptacles being provided with openings in alinement with the openings for the admission of light to the dark chamber, substantially as set forth.

3. An instrument for applying the color test to substances comprising a dark chamber provided with an opening for the eye and openings for admission of light, a rotary disk, provided with openings to be brought opposite the openings in the dark chamber as the disk is rotated, a gravity-shutter for opening and closing an opening in the said rotary disk, means for rotating the disk and receptacles within the dark chamber for receiving samples to be tested, the walls of said receptacles being provided with openings in alinement with the openings for the admission of light, substantially as set forth.

In testimony that I claim the foregoing as my invention I have signed my name, in presence of two witnesses, this 26th day of February, 1901.

JOHN FREDERICK GRAAE.

Witnesses:
FREDK. HAYNES,
HENRY THIEME.

Correction in Letters Patent No. 696,371.

It is hereby certified that in Letters Patent No. 696,371, granted March 25, 1902, upon the application of John Frederick Graae, of Brooklyn, New York, for an improvement in "Instruments for Testing Translucent Substances by Color," an error appears in the printed specification requiring correction, as follows: The words "of one," line 38, page 3, should be stricken out; and that the said Letters Patent should be read with this correction therein that the same may conform to the record of the case in the Patent Office.

Signed, countersigned, and sealed this 1st day of April, A. D., 1902.

[SEAL.]

F. L. CAMPBELL,
*Assistant Secretary of the Interior.*

Countersigned:
F. I. ALLEN,
*Commissioner of Patents.*